(12) United States Patent
Pellerito et al.

(10) Patent No.: US 8,202,473 B2
(45) Date of Patent: Jun. 19, 2012

(54) FRAMED TEM MACHINE AND METHOD OF OPERATING SAME

(75) Inventors: Richard A. Pellerito, Redford, MI (US); James H. Wawrzyniak, Troy, MI (US); Axel Willi Kieser, Ingersheim (DE); Miles Edmond Loretta, Greenville, SC (US); Daryl Duane Perkins, Clinton Township, MI (US)

(73) Assignee: Kennametal Inc., Latrobe, PA (US)

( * ) Notice: Subject to any disclaimer, the term of this patent is extended or adjusted under 35 U.S.C. 154(b) by 742 days.

(21) Appl. No.: 12/204,249

(22) Filed: Sep. 4, 2008
(Under 37 CFR 1.47)

(65) Prior Publication Data
US 2009/0277538 A1 Nov. 12, 2009

Related U.S. Application Data

(63) Continuation-in-part of application No. 12/115,566, filed on May 6, 2008, now Pat. No. 8,157,497.

(51) Int. Cl.
*B23K 7/00* (2006.01)
(52) U.S. Cl. .............................. 266/51; 148/200; 266/50
(58) Field of Classification Search .................... 266/48, 266/51, 249, 50, 49; 414/147, 150; 29/33 A; 148/200
See application file for complete search history.

(56) References Cited

U.S. PATENT DOCUMENTS

| | | | |
|---|---|---|---|
| 2,269,595 A * | 1/1942 | Miller | 432/152 |
| 3,475,229 A | 10/1969 | Geen et al. | |
| 3,666,252 A | 5/1972 | Rice | |
| 3,992,138 A | 11/1976 | Leisner | |
| 4,025,062 A | 5/1977 | Johnstone et al. | |
| 4,269,677 A | 5/1981 | Blomsterberg | |
| 4,486,173 A * | 12/1984 | Hieber et al. | 432/205 |
| 4,760,630 A | 8/1988 | Conrad et al. | |
| 4,796,868 A | 1/1989 | Bozhko et al. | |
| 4,819,917 A | 4/1989 | Cherendin et al. | |
| 4,925,499 A | 5/1990 | Wohr | |

(Continued)

FOREIGN PATENT DOCUMENTS

EP    1693137    8/2006

(Continued)

OTHER PUBLICATIONS

Extrude Hone to Debut New Single Station Thermal Energy Method (http://www.kennametal.com/en/common/global_Print.jhtml) Aug. 2, 2007, Irwin, Pennsylvania.

(Continued)

*Primary Examiner* — Scott Kastler
*Assistant Examiner* — Michael Aboagye
(74) *Attorney, Agent, or Firm* — Matthew W. Smith, Esq.

(57) ABSTRACT

A thermal energy method (TEM) machine for deburring and deflashing work pieces, the TEM machine having an explosion load bearing frame. The frame comprises spaced apart coparallel first and second frame walls and a lateral structural member spacing apart the first and second frame walls. The top portion of the TEM combustion chamber is supported by the lateral structural member. The first and second frame walls are adapted to support a vertical displacement means. The first and second frame walls, the lateral structural member, and the vertical displacement means cooperate to contain vertically-directed explosion forces exerted upon the combustion chamber during the operation of the combustion chamber. Methods for deburring and/or deflashing using such TEM machines are also disclosed.

15 Claims, 8 Drawing Sheets

U.S. PATENT DOCUMENTS

| | | |
|---|---|---|
| 7,068,925 B2 * | 6/2006 | Bayne .......................... 392/416 |
| 7,264,436 B2 | 9/2007 | Tillmann |
| 7,399,154 B2 * | 7/2008 | Tamai .......................... 414/217 |
| 2006/0192327 A1 * | 8/2006 | La Gala ........................ 266/249 |

FOREIGN PATENT DOCUMENTS

| | | |
|---|---|---|
| JP | 2000-343475 | 12/2000 |
| JP | 2001-110874 A | 4/2001 |
| KR | 10-2004-0104469 | 12/2004 |
| WO | WO 03-033220 | 4/2003 |
| WO | WO 2009/137542 | 11/2009 |

OTHER PUBLICATIONS

TEM machines are designed and constructed to operate 24/7, (http://www.extrudehone.com/equipment/standard/tem) dated Jul. 3, 2008.

* cited by examiner

US 8,202,473 B2

FRAMED TEM MACHINE AND METHOD OF OPERATING SAME

CROSS-REFERENCE TO RELATED APPLICATIONS

This application is a continuation-in-part of co-pending application Ser. No. 12/115,566, which was filed on May 6, 2008, and is hereby incorporated herein by reference.

FIELD OF THE INVENTION

The present invention is directed to thermal energy method (TEM) machine for deburring and deflashing parts and having a novel explosion load-bearing frame. The present invention is also directed to methods of removing burrs and/or flashing from manufactured parts by using such TEM machines.

BACKGROUND OF THE INVENTION

Thermal energy method (TEM) machines use short bursts of intense heat to simultaneously deburr and deflash internal and external surfaces of a work piece without affecting or compromising adjoining component surfaces. TEM machines can be used on a wide range of work pieces that have undergone the machining process or have undergone machining and shaping. Typically TEM machines are larger in size and utilize an assembly line type of part loading system. An example of the loader for TEM machine is a rotary table having parts aligned along the circumference of the table. The table rotates the pieces into a work area where the TEM process is carried out. Such machines are used for processing a high volume of parts, are quite large and take up significant amount of facility space. In short, these larger TEM machines and their loaders are not always practical for small run applications or facilities with limited space. Thus, there is a need for reducing the overall size of the TEM machine by developing new and improved loader assemblies.

Although TEM machine technology is forty years old and is a commercially popular method of deburring and deflashing production parts, only a few basic TEM machine designs have been employed over the years. The earliest TEM machines, as exemplified by U.S. Pat. No. 3,475,229 to Geen et al., were frameless and used self-contained pressure vessels as combustion chambers. Within a short time, however, explosion load-bearing frames were developed to help contain the vertically-directed, i.e., axially-directed with respect to the combustion chamber, forces needed to seal a bottom portion of the combustion chamber against a top portion of the combustion chamber during the TEM process.

The development of the explosion load-bearing frame permitted rapid cycling of the TEM machines as a bottom portion of the combustion chamber carrying workpieces could be quickly brought into position against a corresponding top portion and then subsequently be removed after the combustion explosion and replaced by another bottom portion in rapid succession. Nonetheless, until now, only two basic explosion load-bearing frame designs have been developed to the present inventors' knowledge.

One is the C-frame design, as exemplified by U.S. Pat. No. 3,666,252 to Rice and U.S. Pat. No. 4,796,868 to Bozhko et al. A typical C-frame design has an upright member or members secured to a base and a top laterally projecting element or elements. The top portion of the combustion chamber depends from the laterally projecting element(s) and the bottom portion of the combustion chamber is moveably supported upon a vertical displacement means, such as a mechanical knuckle-jointed linkage jack or a hydraulic cylinder, which rests upon the frame base. During the combustion explosion, the upwardly-directed axial forces from the explosion are transferred from the combustion chamber top portion to the laterally projecting element and therefrom to the upright member(s), and the downwardly-directed axial forces are transferred from the combustion chamber bottom portion to the frame base and therefrom to the upright member(s), thus applying a tensile load to the entire length of the upright member(s) between the attachment points of the laterally projecting element(s) and the frame base.

The other basic explosion load-bearing frame design is the portal design, as exemplified by U.S. Pat. No. 3,992,138 to Leisner and U.S. Pat. No. 4,486,173 to Hieber et al. In the portal form, a number of upright members, typically two or three, are connected together at or near their tops by one or more lateral elements, while at their bottoms, they are connected together by a base. As with the C-frame, the top portion of the combustion chamber is supported by the lateral element(s) and the bottom portion of the combustion chamber is moveably supported upon a vertical displacement means which rests upon the frame base. Also like the C-frame TEM machines, a tensile load is applied by the TEM process combustion explosion to the entire length of the upright member(s) between the attachment points of the laterally projecting element(s) and the frame base.

Person skilled in the art will recognize that some TEM machines have been developed which may appear to unskilled persons to have an explosion load-bearing frame, but which are actually frameless. Like their framed counterparts, such TEM machines typically use a vertical displacement means to bring the bottom portion of a combustion chamber into position against a suspended corresponding top portion. However, in these TEM machines, some mechanism is provided to cause the top and bottom portions of the combustion chamber to interlock together to form a self-contained pressure vessel so that the interlocking prevents the axially-directed forces resulting from the TEM process explosion from blowing the top and bottom portions apart. Examples of such frameless TEM machines are disclosed by U.S. Pat. No. 4,025,062 to Johnstone et al., U.S. Pat. No. 4,760,630 to Conrad et al., and U.S. Pat. No. 4,819,917 to Cherendin et al. Among the disadvantages of the frameless TEM machines are (1) the wear caused by the interlocking on both the seals and the interlocking mechanisms and (2) the longer times cycle times resulting from the time needed for the locking and unlocking of the interlocking mechanisms to occur.

SUMMARY OF THE INVENTION

Swing Arm Loader Assembly

This aspect of the present invention relates to a loader assembly for a TEM machine having a retractable arm that is moveable between a retracted position and an extended position. A hoop portion of the retractable arm also moves between the retracted position and the extended position. A lower closure for holding a part to be processed in the TEM machine, i.e., the lower portion of the combustion chamber, is removably positioned in the hoop portion. A ram piston of the TEM machine is movable between a load position and a process position. When the ram piston moves from a load position to a process position the ram piston contacts the lower closure and extends through the hoop of the retractable arm to move the lower closure to the process position. A thermal chamber receives the lower closure when the ram piston moves to the process position. For ease of description, this aspect of the present invention is sometimes identified herein and in the appended claims as a "swing arm loader assembly."

Explosion Load-Bearing Frame

The inventors of the present invention also have developed a TEM machine having a novel economical, explosion load-bearing frame design that overcomes at least some of the drawbacks of prior art TEM machines. The term "explosion load-bearing frame" is used herein and in the appended claims to refer to a TEM machine frame that serves to contain the vertically-directed, i.e., axially-directed, explosive forces and thereby help to keep sealed a bottom portion of the combustion chamber (also sometimes referred to herein as a "lower closure") of the TEM machine against a corresponding top portion during the TEM process. Sometimes, for ease of description, the term "explosion load-bearing frame" is shortened to "frame" herein and in the appended claims whenever from the context it is clear that an explosion load-bearing frame is being referred to.

The novel frame design of this aspect of the present invention employs two coparallel frame walls as its upright members. The plates may be solid or hollow, apertureless or apertured, and may have stiffeners, reinforcements, and/or ribbings. The frame walls are spaced apart by and interconnected by a lateral structural member. The lateral structural member may be monolithic, e.g., a single beam or plate, or comprise subcomponents, e.g. multiple beams, rods, or plates or combinations thereof. The lateral structural member supports the top portion of the combustion chamber. The frame walls are adapted to carry the vertical displacement means of the TEM machine so that the frame walls, the lateral structural member, and the vertical displacement means cooperate to contain the vertically-directed explosion forces exerted upon the combustion chamber during the operation of the combustion chamber. Thus, in embodiments of the present invention, a substantially smaller proportion of the frame walls receive the full tensile load from the TEM process explosions than is the case with the upright members of the prior art TEM machine frame designs. This is because in the present invention, only the portions of the frame walls which are between their connections with the lateral structural member and their areas that are adapted to carry the vertical displacement means are subjected to the full tensile loads from the TEM process explosions. This provides the advantage that the portions of the frame which lie below the areas that are adapted to carry the vertical displacement means on the frame walls need not be as structurally robust as the higher portions of the frame. Thus, in contrast to the higher portions, these lower portions can be made thinner, and/or with less stiffeners, reinforcements, and/or ribbings, and/or be made of materials having lower tensile strength.

Furthermore, unlike prior art designs, the frames of the present invention do not require a base or floor member to support the vertical displacement means of the TEM machines of which they are a part. Nonetheless, some embodiments of the present invention may include a base or floor member to aid in construction of the TEM machine or for other purposes, e.g. for providing closure or adding structural stability during the placement or replacement of the vertical displacement means.

The present invention includes TEM machines having the aforementioned novel frame design in conjunction with any type of loader assembly known in the art for loading combustion chamber lower portions. For example, in some such TEM machines of the present invention, the loader assembly is a rotary table loader. In other such TEM machines of the present invention, the loader assembly comprises the swing arm assembly loader. However, it is to be understood, that TEM machines having the novel frames of the present invention do not necessarily include a loader assembly.

The present invention also includes methods of removing burrs and/or flashing from manufactured parts by using TEM machines having such novel frames.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Swing Arm Loader Assembly

Figure 1:
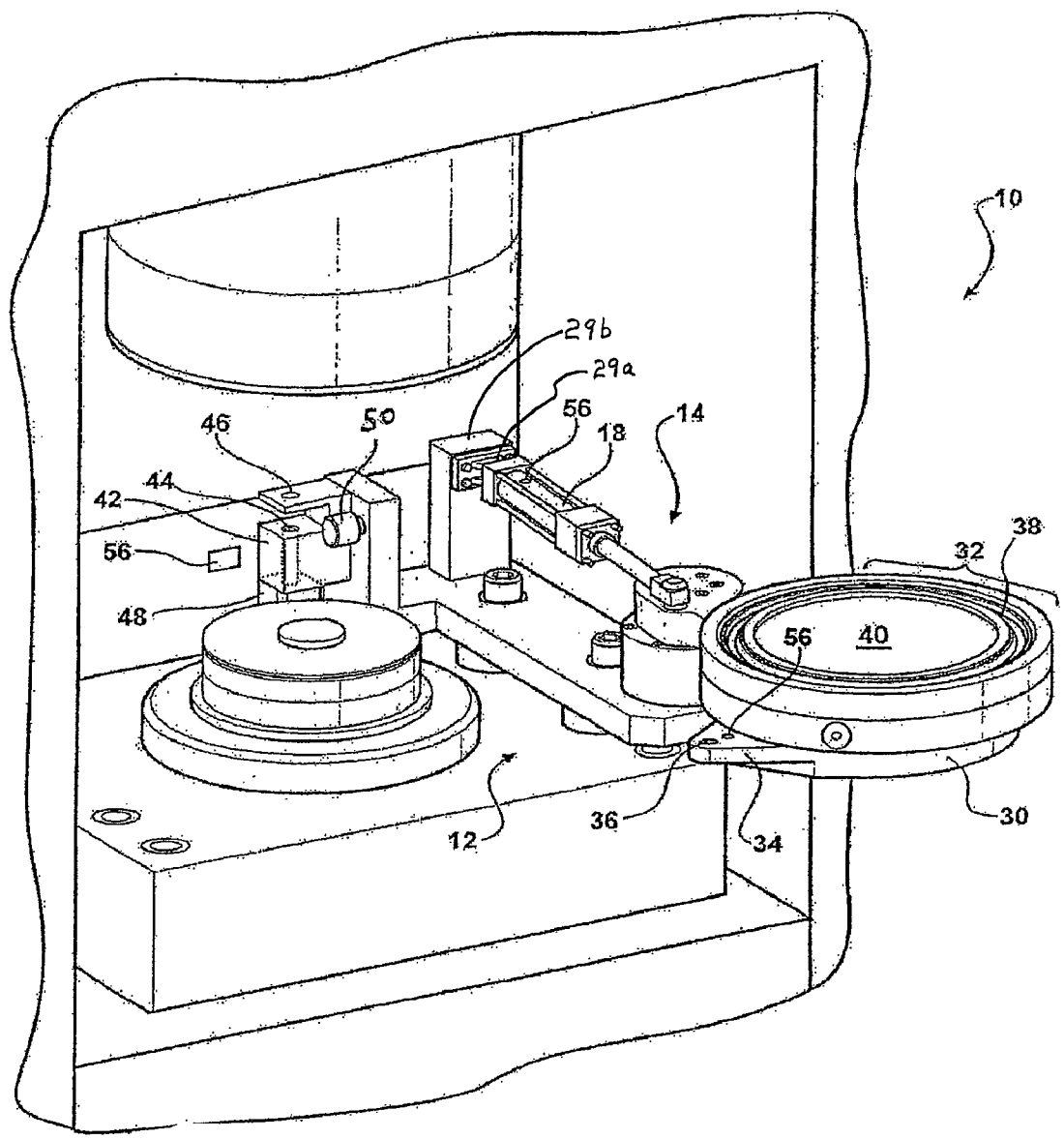
FIG. 1 is a perspective view of the loader assembly as used in a TEM machine wherein the retractable arm is in the extended position.
Figure 2:
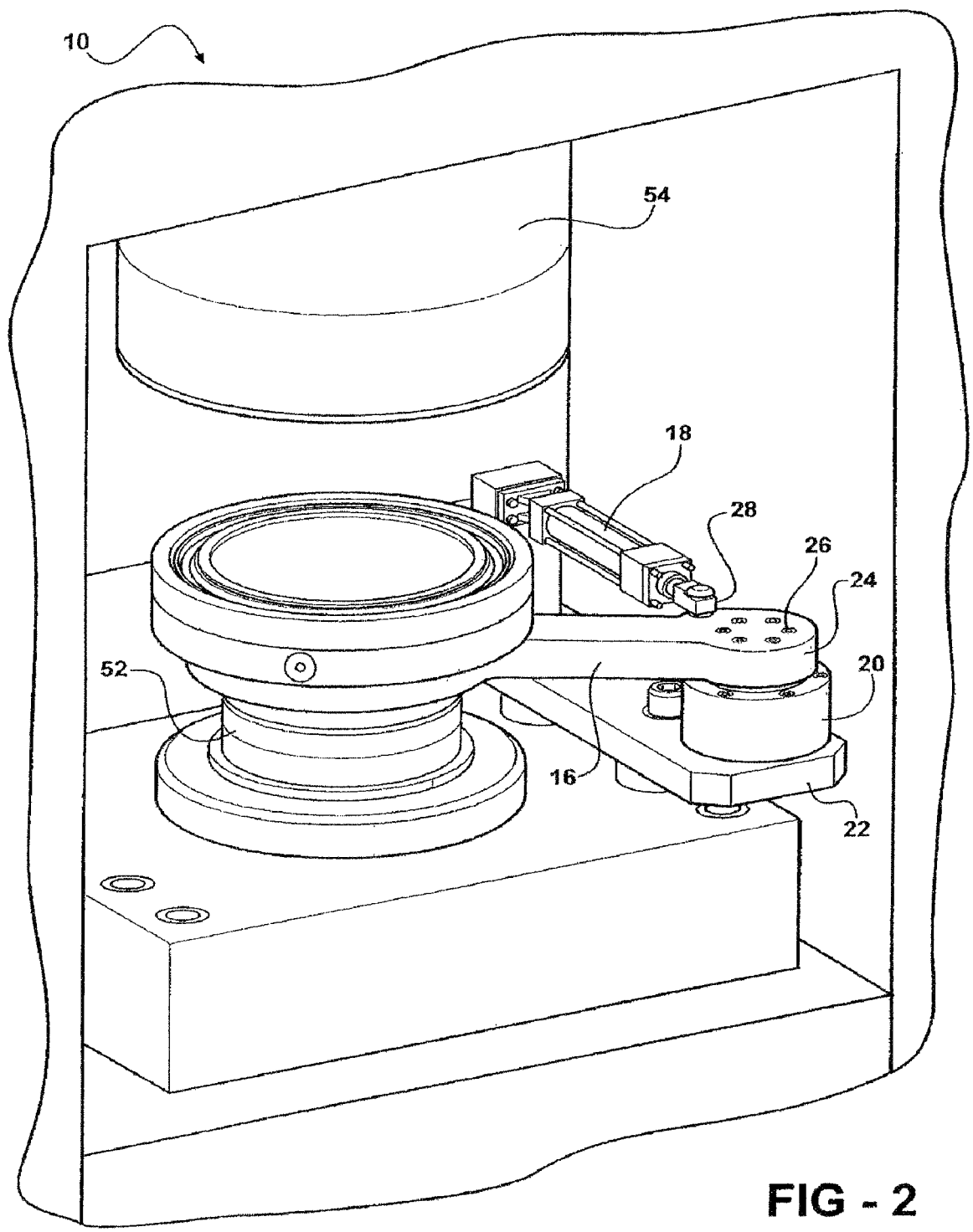
FIG. 2 is a perspective view of the loader assembly, wherein the retractable arm is in the retracted position.

Referring now to FIGS. 1 and 2, a thermal energy method (TEM) machine 10 is shown with a loader assembly 12 in accordance with one embodiment of the present invention. The loader assembly 12 has a base 22 upon which the components of the loader assembly 12 are connected. The base 22 is not necessarily required for all embodiments of the invention; however, it provides a way of quickly installing the loader assembly 12 and ensuring alignment of all the components. The loader assembly 12 includes a retractable arm 14 that pivots between an extended position and a retracted position. FIG. 1 shows the retractable arm 14 in the extended position, while FIG. 2 shows the retractable arm 14 in the retracted position.

The retractable arm 14 includes a pivot arm 16 and an actuator 18. The pivot arm 16 pivots about a point which is located on an upper clevis 24 of the pivot arm 16. The upper clevis 24 is rotatably connected to a stationary clevis 20. Bearing members 26 are located between the lower stationary clevis 20 and upper clevis 24 to facilitate the rotation. While the pivot arm 16 is described herein as having an upper and lower clevis to facilitate the rotation of the pivot arm 16 between the extended and retracted position, it is within the scope of this invention to have a different type of rotation arrangement. For example, a hinge or shaft with pin can be used to rotate the pivot arm 16 between the extended position and the retracted position.

The actuator 18 is connected to the upper clevis 24 at a connector joint 28. The actuator 18 as shown is a telescopic hydraulic cylinder that extends and retracts and forces the pivot arm 16 to rotate. While the actuator 18 is shown as being hydraulic, it is possible for the actuator to be something other than a hydraulic actuator, for example, a mechanical worm drive, a mechanical lever driven by a motor, or an electromechanical device can be used in the place of an actuator. Essentially the actuator 18 can be any type of device that provides enough force to provide the push/pull type of force required to the pivot arm 16. As shown in FIGS. 1 and 2, the actuator 18 is connected to a hinge 29a that is connected to a column 29b. The column 29b extends from the base 22 of the loader assembly 12.

Figure 5:
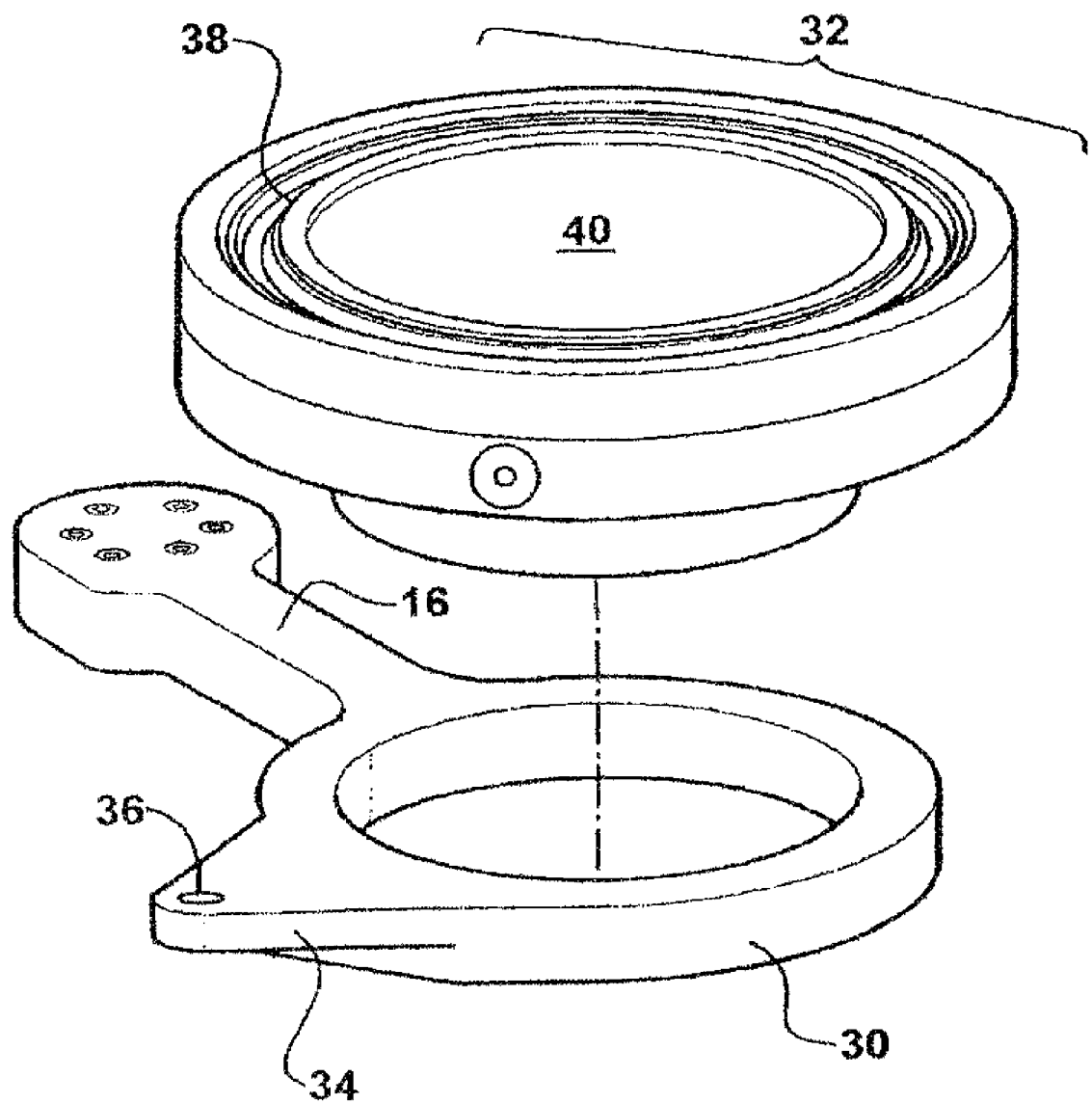
FIG. 5 is an exploded perspective view of the pivot arm and lower closure.

The pivot arm 16 also has a hoop portion 30 that moves between the extended and retracted position. The hoop portion 30 is best shown in FIG. 5 and is a frame or ring with an aperture through the center. The hoop portion 30 is configured to receive a lower closure 32. The lower closure 32 has a portion that sets through the aperture of the hoop portion 30. The lower closure 32 is used to hold a part in a part holder area 40. A seal 38 at the lower closure 32 is also present around the part holder area 40, and its function is described below.

The hoop portion 30 has an alignment tab 34 with a pin shaft hole or alignment hole 36. When the retractable arm moves from the extended position to the retracted position, the alignment tab 34 is configured to slide into a shot pin 42 which is connected to the base 22 of the loader assembly 12. The shot pin 42 has an alignment hole 46 that aligns with the alignment hole 36 of the alignment tab 34. A pin 44 contained in a small cylinder 48 extends through the alignment holes 36, 46 when the alignment tab 34 is aligned with the shot pin 42. The extension of the alignment pin 44 holds the retractable arm 16 in place during the TEM process. Additionally, the shot pin 42 also has a stop 50, which can be a metal stop to prevent the hoop portion 30 of the pivot arm 16 from banging against the shot pin 42 during rotation. The stop 50 acts as a pre-alignment stopper and does not necessarily have to be formed of metal but could also include a softer substance such as rubber.

The TEM machine 10 also includes a ram piston 52 which extends from a load position upward vertically to a process position. A thermal chamber 54 is located above the ram piston 52. The thermal chamber 54 is where parts or components are processed. When the hoop portion 30 of the pivot arm 16 moves from the extended position to the retracted position the alignment tab 34 moves into position with respect to the shot pin 42.

When the pin 44 from the small cylinder 48 extends through the alignment hole 36 of the alignment tab 34 and the alignment hole 46 of the shot pin 42, the ram piston 52 is aligned with the aperture of the hoop portion 30, lower closure 32, and the thermal chamber 54. At this point the ram piston 52 is in the load position below the hoop portion 30 and lower closure 32. The ram piston 52 is then moved vertically upward to contact the bottom of the lower closure 32 and raise the lower closure 32 off of the hoop portion 30, with the ram piston 52 extending through the aperture of the hoop portion 30. The ram piston 52 continues to move vertically upward to a load position where the lower closure 32 presents a part located in the part holder area 40 to the thermal chamber 54. The seal 38 on the lower closure aligns with the thermal chamber 54 to form a seal between the thermal chamber 54 and the lower closure 32 so that the part can be processed. At this point, the ram piston 52 is in the process position. Once the TEM process is carried out, the ram piston 52 lowers from the process position back to the load position and the lower closure 32 is set back into position on the hoop portion 30. The pivot arm 16 moves from the retracted position to the extended position where a processed part is then unloaded from the part holder area and a new part to be processed is placed onto the holder area.

Figure 3:
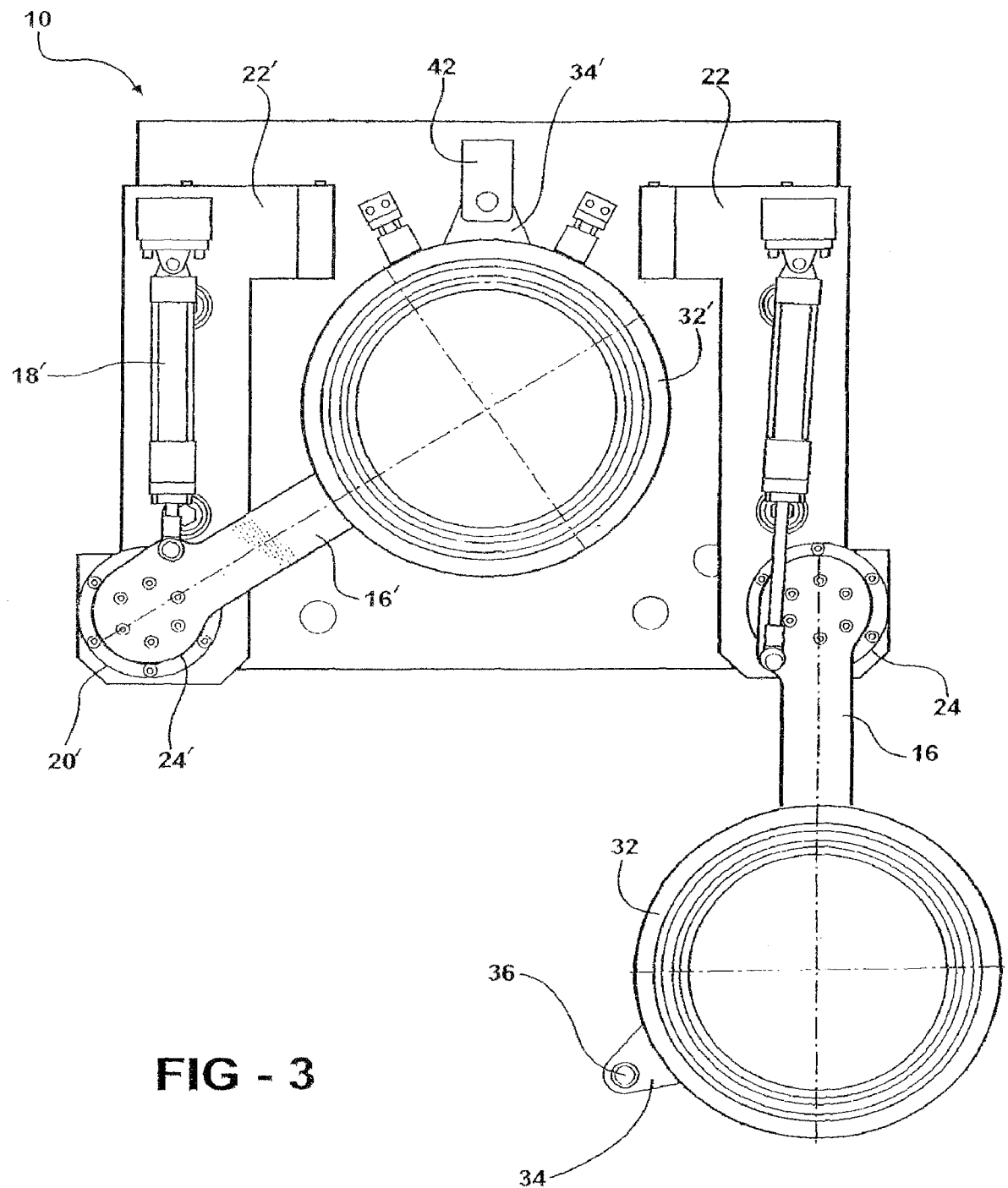
FIG. 3 is an overhead plan view of an alternate embodiment of a loader assembly incorporating the use of two retractable arms which are synchronized to move between the retracted and extended positions.
Figure 4:
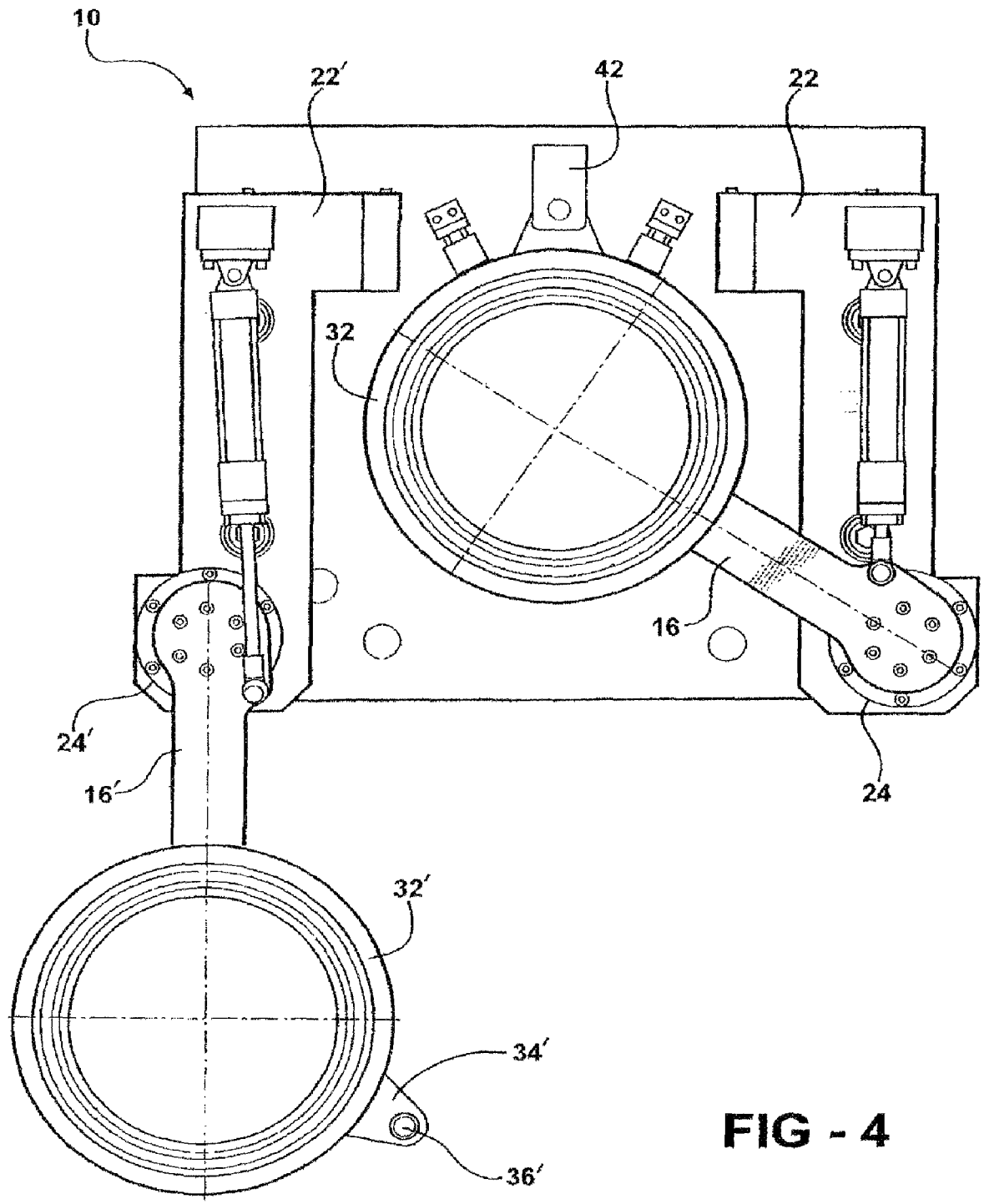
FIG. 4 is an overhead plan view of the alternate embodiment depicted in FIG. 3 with the two retractable arms in positions opposite those shown in FIG. 3.

Referring now to FIGS. 3 and 4, an alternate embodiment of the invention is shown. This alternate embodiment of the invention has a TEM machine 10' has two bases 22, 22' each supporting a retractable arm 14, 14' configured to move between a retracted position and an extended position in sequential fashion. It is within the scope of this invention to have a single base member with both retractable arms mounted thereon; however, it is not entirely necessary. This allows a user of the TEM machine 10' to load parts onto one retractable arm while a part on the second retractable arm is being processed. This increases the overall production of the TEM machine 10' since parts can be constantly loaded and unloaded. In this embodiment the retractable arm is a first retractable arm. The first retractable arm 14 and the second retractable 14' operate in essentially the same manner with the primary difference being their position with respect to the ram piston 52. The two arms can be arranged at opposite, adjacent, or vertically with respect to one another about the ram piston 52. The second retractable arm 14' has a pivot arm 16' having a hoop portion 30' with a lower closure 32' placed thereon as well as an actuator 18'. A shot pin 42' in this alternate embodiment of the invention is configured in a slightly different manner such that it is positioned to receive both the first retractable arm 14 and the second retractable arm 14' and eliminate the need for a second shot pin.

When the first retractable arm 14 is in the extended position, the second retractable arm 14' can be moved to the retracted position and a part on the lower closure 32' of the second retractable arm 14' can be processed in the thermal chamber (not shown). After the part on the lower closure 32' is processed in the same manner as described above with respect to FIGS. 1 and 2, the second retractable arm 14' pivots from the retracted position to the extended position and the first retractable arm 14, which has a fresh part loaded thereon, moves from the extended position to the retracted position in a sequential manner. The part on the first retractable arm 14 is then processed in the same manner as described above with respect to FIGS. 1 and 2, while the processed part on the second retractable arm 14' is removed and a fresh part is loaded onto the lower closure 32'.

In another aspect of the present invention, one or more sensors 56 can be incorporated into the various components of the TEM machine 10. For example, a sensor 56 can be implemented on the actuator 18, the alignment tab 34, or near the shot pin 42. The sensor can be any type of sensor suitable for determining the position of the pivot arm 14. For example, the sensors 56 could be proximity sensors that determine the presence or absence of the pivot arm at a certain location, contact sensors that are activated when two components come into contact or any other suitable sensor device. Additionally, a sensor associated with the actuator 18 may determine the extension or retraction of the actuator. Thus, another aspect of the invention involves controlling the method of operation of the loader assembly 12 by coordinating with the sensors.

Explosion Load-Bearing Frame

Figure 7:
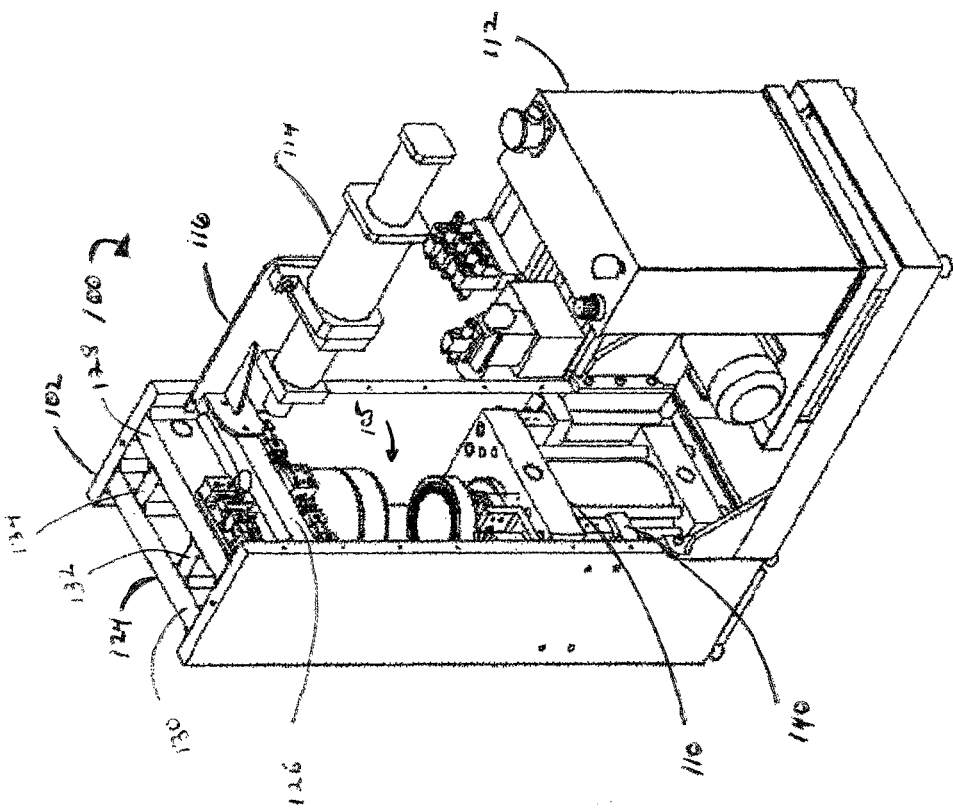
FIG. 7 is an isometric rear view of the preferred embodiment of FIG. 6.
Figure 6:
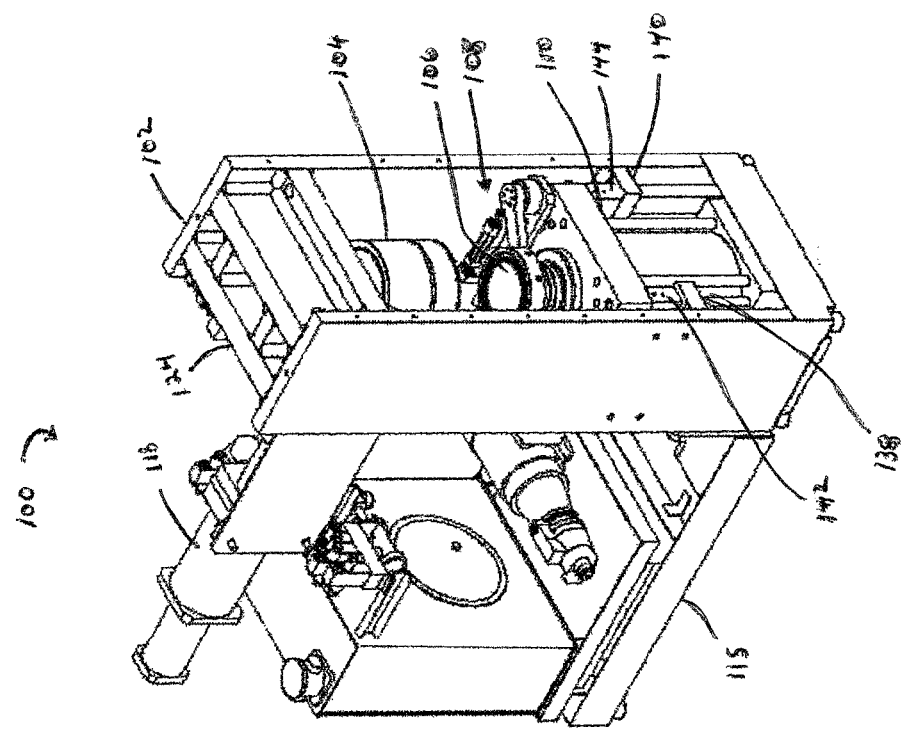
FIG. 6 is an isometric front view of a TEM machine according to a preferred embodiment of the present invention.

Some preferred embodiments of the present invention comprising a novel explosion load-bearing frame will now be described. Referring to FIGS. 6 and 7, there are shown, respectively, isometric views of the front and rear of a TEM machine 100 having a novel frame 102 according to an embodiment of the present invention. In addition to the frame 102, the TEM machine 100 also comprises: a two-part combustion chamber 105 comprising an upper portion 104 and a lower portion 106; a loader assembly 108; a vertical displacement means in the form of hydraulic cylinder 110 for lifting a combustion chamber lower portion 106 into sealing contact with combustion chamber upper portion 104; a hydraulic power unit 112 and associated hardware for supplying power to the hydraulic cylinder 110; a process gas delivery and venting system 114 for selectively supplying the process gases to the closed combustion chamber and expelling the combusted gases during the TEM process; a platform 115 for supporting, inter alia, the hydraulic power unit 112; a support plate 116 attached to the frame 102 for supporting the charging cylinder component 118 of the process delivery and venting system 114; and a protective enclosure (not shown) for safely and cleanly enclosing the TEM machine 100 during operation.

Figure 8:
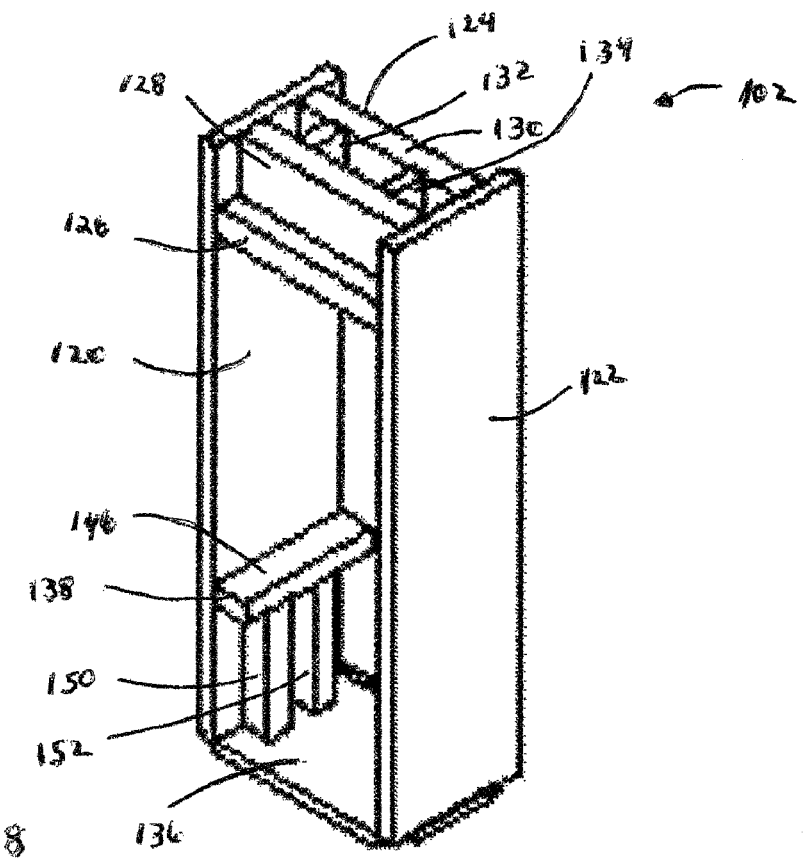
FIG. 8 is an isometric front view of the explosion load-bearing frame of the preferred embodiment of FIG. 6.
Figure 9:
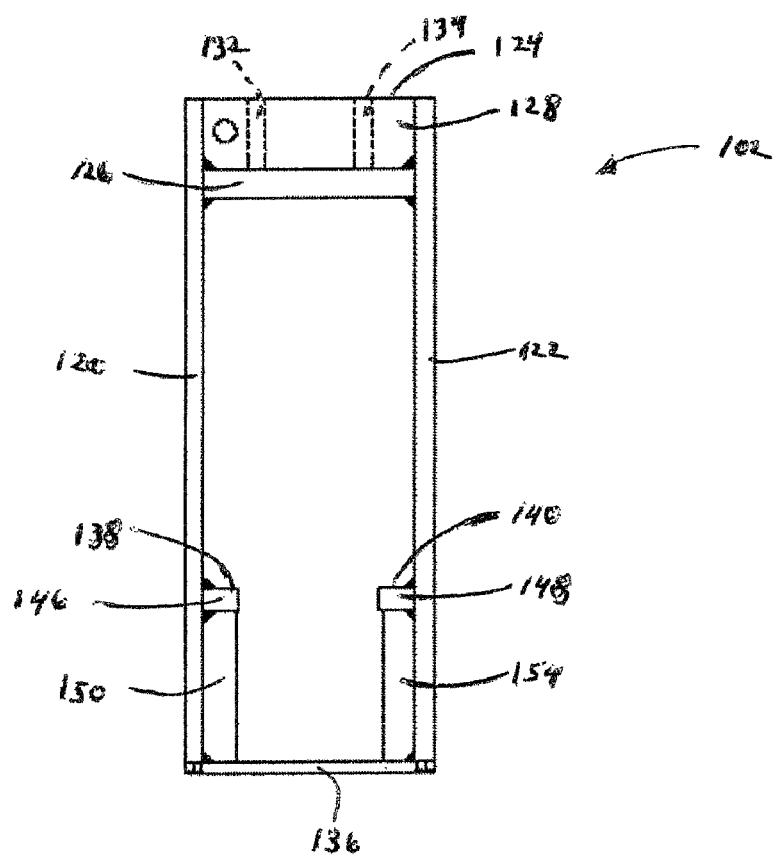
FIG. 9 is an elevational front view of the frame of shown in FIG. 8.

FIGS. 8 and 9 show, respectively, isometric and front elevational views of the frame 102 in its unadorned state. The frame 102 comprises coparallel first and second frame walls 120, 122 and lateral structural member 124 spacing apart said first and second frame walls 120, 122 near and at their top ends. As best seen in FIG. 7, the lateral structural member 124 in this embodiment consists of a horizontal plate 126, cross beams 128, 130, and stiffeners 132, 134. Referring to FIGS. 6 and 7, the lateral support member 124 supports the combustion chamber top portion 104.

In this embodiment of the present invention, frame 102 also comprises bottom plate 136. Note that the hydraulic cylinder 110 is primarily carried by the first and second frame walls 120, 122, rather than the bottom plate 136. In this embodiment, the bottom plate 136 acts as a bottom closure for the frame and aids in the construction of the frame as is described in the next paragraph.

The first and second frame walls 120, 122 are adapted to support the hydraulic cylinder 110 by way of first and second shelves 138, 140 and spacers 142, 144 (best seen in FIGS. 6 and 7). First and second shelves 138, 140 include first and second horizontal members 146, 148, respectively, and their associated sets of vertical stabilizers 150, 152 and 154, 156 (note that vertical stabilizer 156 is not visible in any of the FIGS.). During construction of the frame 102, after the first and second frame walls 120, 122, the lateral structural member 124, and the base plate 136 have been joined together into a rectangular unit, first and second shelves 138, 140 are constructed by standing the four vertical stabilizers 150, 152, 154, 156 upright on the base plate 124 and then each is attached to one of the first and second frame walls 120, 122. First horizontal member 146 may then be placed atop vertical stabilizers 150, 152 and attached to the first frame wall 120 to form the first shelf 138. Likewise, second horizontal member 148 may then be placed atop vertical stabilizers 154, 156 and attached to second frame wall 122 to form the second shelf 140. Subsequently, referring now to FIGS. 6 and 7, the first and second spacers 142, 144 are attached to first and second shelves 138, 140, respectively, and the hydraulic cylinder 110 is placed upon and removably bolted to first and second spacers 142, 144. Alternatively, the first and second horizontal members 146, 148 may be pre-drilled and tapped and bolted into a fixture that holds them in a spaced relationship and then welded to the side walls 120, 122.

Figure 10B:
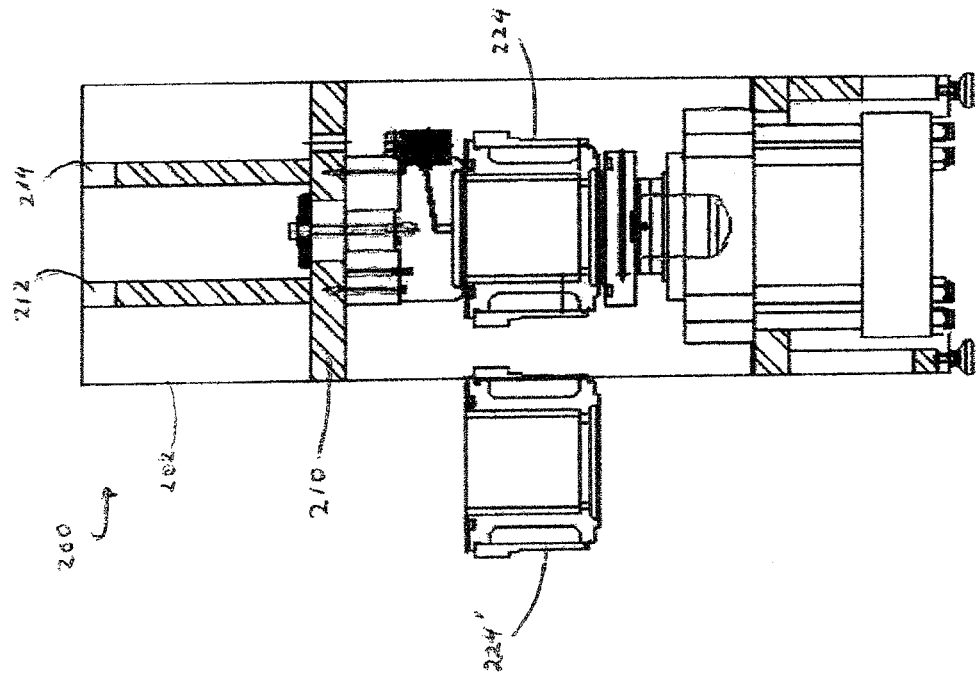
FIG. 10B is a schematic side elevational view, partially in cross-section, taken along line B-B in FIG. 10A, showing the combustion chamber lower portion in both the exchange and engaged positions.
Figure 10A:
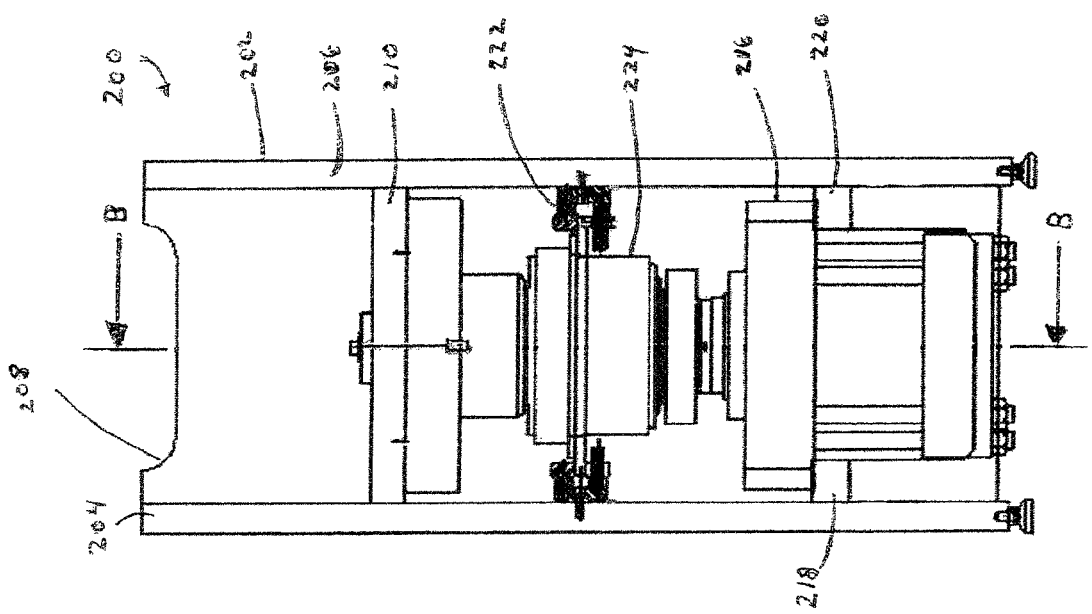
FIG. 10A is a schematic front elevational view of a portion of a TEM machine according to another preferred embodiment of the present invention.

Another embodiment of a TEM machine in accordance with the present invention is shown in part in FIGS. 10A and 10B to illustrate an alternative version of the novel explosion load-bearing frame design. The frame 202 of the TEM machine 200 comprises coparallel first and second frame walls 204, 206 and a lateral structural member 208. Note that frame 200 has no bottom plate. The hydraulic cylinder 216, which is the vertical displacement means for this embodiment, is directly supported by first and second shelves 218, 220 (which are attached to, respectively, first and second frame walls 204, 206) without the interposition of spacers.

The lateral structural member 208 consists of horizontal plate 210 and first and second cross-plates 212, 214. Unlike the lateral structural member 124 shown in the embodiment of the present invention described above in reference to FIGS. 6-9, the lateral structural member 208 has no stiffeners.

TEM machine 200 uses a sliding table-style loader assembly 222. FIG. 10B schematically shows the combustion chamber lower portion 224 in the engaged position and in the exchange position (as 224').

The components of the novel frame may have other configurations in other embodiments of the present invention. For instance, the lateral structural element may be one or more solid or hollow, unapertured or apertured plates, one or more solid, angle, channel, or I-beams, or other structural shapes, either alone or in combination with one another and may also have stiffeners and/or ribbings, so long as the lateral structural element is able to perform its function of supporting the upper combustion chamber in such a way as to transmit the upwardly-directed load from the TEM process explosion to the frame's frame walls. Similarly, the frame walls can be solid or hollow, unapertured or apertured.

Likewise, the present invention contemplates many ways for adapting the first and second frame walls to support the vertical displacement means of the TEM machine. For example, one or more shelves of any suitable design may be used for this purpose, including those which span the entire width between the first and second frame walls. In some embodiments of the present invention, the vertical displacement means is either removably or permanently attached directly or indirectly to one or both of the first and second frame walls. An example of indirect attachment is shown in FIGS. 6 and 7 wherein the hydraulic cylinder 110 attached to first and second spacers 142, 144, which in turn are bolted to first and second shelves 138, 140 which are welded to first and second frame walls 120, 122. An example of direct attachment is an embodiment of the present invention wherein the vertical displacement means is directly bolted to the first and second frame walls. In other embodiments of the present invention, however, the vertical displacement means is not attached, either directly or indirectly, to either of the first and second frame walls.

The present invention also contemplates that the lateral structural member may be adapted to support the combustion chamber upper portion in any way that is known to those skilled in the art, e.g., by bolting, jointing, pinning, etc.

In the embodiment of the present invention shown in FIGS. 6-9, the components of the frame 102 are welded together. However, it is within the contemplation of the present invention to use any other means of attachment known to those skilled in the art and suitable for sustaining the expected service loads to interconnect the various components of the TEM frame, e.g., bolting, riveting, etc. Preferably, the frame is made from steel, e.g., hot rolled steel, although any suitable structural material may be used. Persons skilled in the art know how to size the frame and the components thereof in accordance with the service loads that are expected to be encountered during the TEM machine operation and to accommodate the size of the combustion chamber with which the frame is to be used.

In accordance with the present invention, any suitable vertical displacement means known to those skilled in the art may be used the TEM machines having the novel frame design. To be suitable, a vertical displacement means needs to be able to reversibly raise and hold the combustion chamber bottom portion in closure with its corresponding upper portion during the TEM process. Thus, suitable vertical displacement means may include one or more of the following: hydraulic cylinder, pneumatic cylinder, electric motor, and mechanical jack (including knuckle-jointed linkage jacks, worm gear jacks, and scissor jacks), either alone or in combination with one another.

The TEM machines having frames in accordance with the present invention may be used to remove burrs and/or flashing from manufactured parts. To accomplish this, the parts are loaded into the combustion chamber, preferably by first loading them into the lower portion of the combustion chamber or a fixture therein or into or onto a fixture which depends from the upper portion of the combustion chamber. The vertical displacement means is operated to bring the bottom and top portions of the combustion chamber into closure with one another. An explosion is then ignited within the combustion chamber to burn away the burrs and/or flashing from the parts. The vertical displacement means is then operated to open the combustion chamber, and the parts are then removed therefrom.

The description of the invention is merely exemplary in nature and, thus, variations that do not depart from the gist of the invention are intended to be within the scope of the invention. Such variations are not to be regarded as a departure from the spirit and scope of the invention. All U.S. patents identified herein are incorporated herein in full by reference.

What is claimed is:

1. A method of removing burrs and/or flashing from manufactured parts, the method comprising the steps of:
   a) providing a TEM machine having:
      i) a combustion chamber, having a top portion and a bottom portion;
      ii) a vertical displacement means for bringing into closure the bottom and top portions of the combustion chamber; and
      iii) an explosion load-bearing frame having:
         A) coparallel first and second frame walls each having a top end and a bottom end, wherein the bottom end of each wall is adapted to rest upon a floor and the frame walls define an inner area;
         B) a lateral structural member interconnected with and spacing apart the first and second frame walls at the top end, wherein the lateral structural member extends from the top end and supports the top portion of the combustion chamber;
         C) wherein the vertical displacement means supports the bottom portion of the combustion chamber and wherein the vertical displacement means is attached directly or indirectly to one or both of the first and the second frame walls at a location spaced upwardly from the bottom end such that a substantially smaller length of the frame walls exists between the top end and the mounting location of the vertical displacement than if the vertical displacement means were supported at a location closer to the bottom end;
         D) wherein the full tensile load of vertically-directed explosion forces exerted upon the combustion chamber during the operation of the combustion chamber is transferred to the frame walls; and
         E) wherein the vertical displacement means is mounted upon a shelf connected to at least one of the first and second frame walls and interposed between at least one of the first and second frame walls and the vertical displacement means and, wherein the shelf extends into the inner area;
   b) loading the parts into the combustion chamber;
   c) operating the vertical displacement means to bring into closure the top and bottom portions of the combustion chamber; and
   d) igniting an explosion within the combustion chamber; and
   e) removing the parts from the combustion chamber.

2. The method of claim 1, wherein the vertical displacement means is a hydraulic cylinder.

3. The method of claim 1, wherein the shelf spans the distance between the first and second frame walls.

4. The method of claim 1, wherein the frame also has a bottom plate, the bottom plate interconnecting the bottom ends of the first and second frame walls.

5. The method of claim 1, wherein the frame also has a loader assembly.

6. The method of claim 5, wherein the loader assembly is a rotary table loader.

7. The method of claim 5, wherein the loader assembly is a swing arm loader assembly.

8. A TEM machine having an explosion load-bearing frame, a combustion chamber and a vertical displacement means for bringing into closure bottom and top portions of the combustion chamber, the explosion load-bearing frame comprising:
   a) coparallel first and second frame walls each having a top end and a bottom end, wherein the bottom end of each wall is adapted to rest upon a floor and the frame walls define an inner area;
   b) a lateral structural member interconnected with and spacing apart the first and second frame walls at the top end, wherein the lateral structural member extends from the top end and supports the top portion of the combustion chamber;
   c) wherein the vertical displacement means supports the bottom portion of the combustion chamber and wherein the vertical displacement means is attached directly or indirectly to one or both of the first and the second frame walls at a location spaced upwardly from the bottom end such that a substantially smaller length of the frame walls exists between the top end and the mounting location of the vertical displacement than if the vertical displacement means were supported at a location closer to the bottom end;

d) wherein the full tensile load of vertically-directed explosion forces exerted upon the combustion chamber during the operation of the combustion chamber is transferred to the frame walls;

e) wherein the vertical displacement means is mounted upon a shelf connected to at least one of the first and second frame walls and interposed between at least one of the first and second frame walls and the vertical displacement means and, wherein the shelf extends into the inner area.

9. The TEM machine of claim 8, wherein the vertical displacement means is a hydraulic cylinder.

10. The TEM machine of claim 8, wherein the vertical displacement means is directly attached to at least one of the first and second frame walls.

11. The TEM machine of claim 8 wherein the shelf spans the distance between the first and second frame walls.

12. The TEM machine of claim 8, further comprising a bottom plate, the bottom plate interconnecting the bottom ends of the first and second frame walls.

13. The TEM machine of claim 8, further comprising a loader assembly.

14. The TEM machine of claim 13, wherein the loader assembly is a rotary table loader.

15. The TEM machine of claim 13, wherein the loader assembly is a swing arm loader assembly.

* * * * *

UNITED STATES PATENT AND TRADEMARK OFFICE
CERTIFICATE OF CORRECTION

PATENT NO. : 8,202,473 B2  
APPLICATION NO. : 12/204249  
DATED : June 19, 2012  
INVENTOR(S) : Pellerito et al.

It is certified that error appears in the above-identified patent and that said Letters Patent is hereby corrected as shown below:

IN THE SPECIFICATION  
In Column 4, Line 25, delete "position;" and insert -- position. --, therefor.  
In Column 4, Line 27, delete "position;" and insert -- position. --, therefor.  
In Column 4, Line 31, delete "positions;" and insert -- positions. --, therefor.  
In Column 4, Line 34, delete "FIG. 3; and" and insert -- FIG. 3. --, therefor.

IN THE CLAIMS  
In Column 12, Line 4, in Claim 11, delete "8" and insert -- 8, --, therefor.

Signed and Sealed this  
Seventh Day of May, 2013

Teresa Stanek Rea  
*Acting Director of the United States Patent and Trademark Office*